Figure 1:
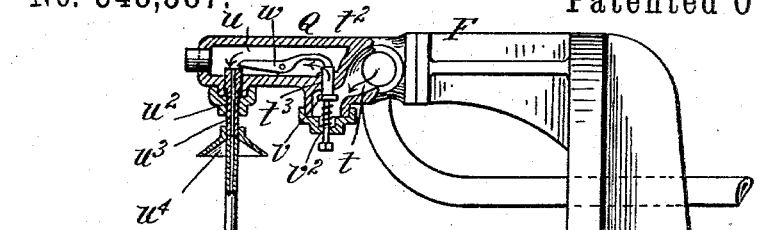

(No Model.) 3 Sheets—Sheet 1.

M. J. OWENS.
MACHINE FOR BLOWING GLASS.

No. 548,587. Patented Oct. 22, 1895.

Fig. 1ª.

Witnesses:
J. D. Garfield
K. S. Clemons

Inventor
Michael J. Owens
by Chapin & Co.
Attorneys.

(No Model.)  3 Sheets—Sheet 2.
M. J. OWENS.
MACHINE FOR BLOWING GLASS.
No. 548,587.  Patented Oct. 22, 1895.
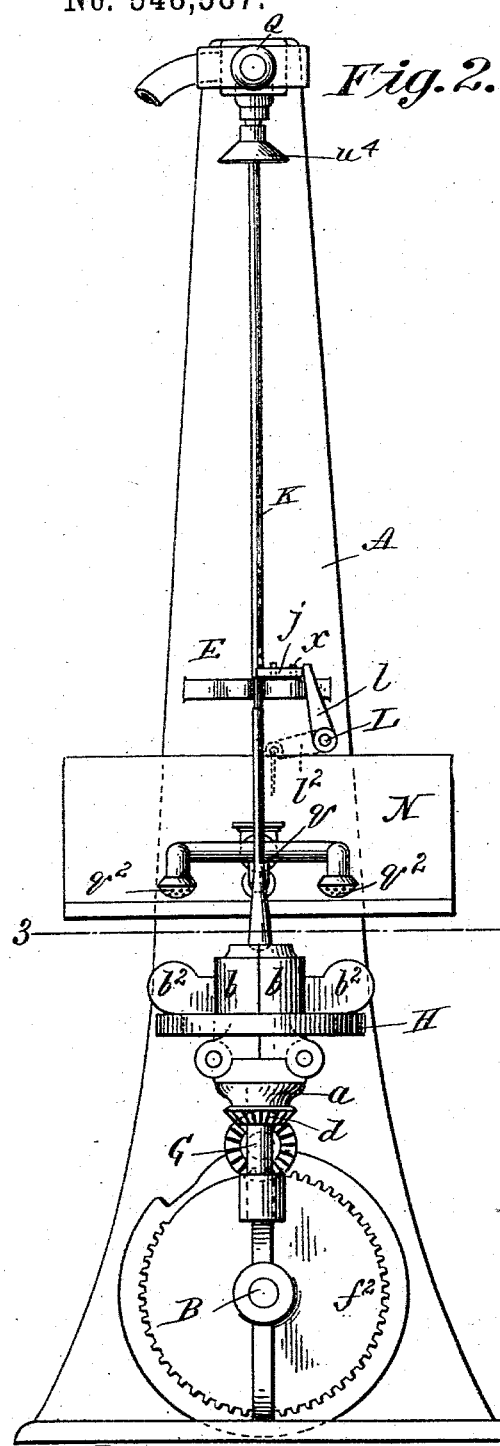
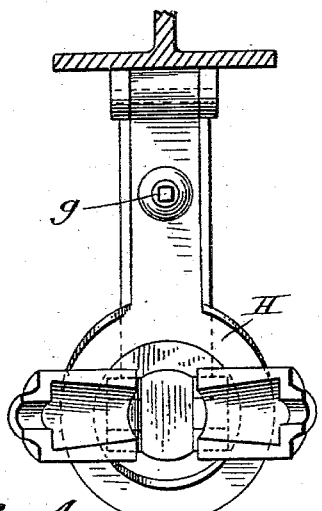
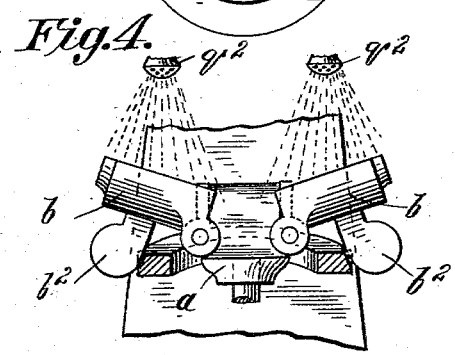
Witnesses:
J. L. Gayfield
H. J. Clemons
Inventor
Michael J. Owens
by Chapin & Co.
Attorneys (No Model.) 3 Sheets—Sheet 3.
M. J. OWENS.
MACHINE FOR BLOWING GLASS.
No. 548,587. Patented Oct. 22, 1895.
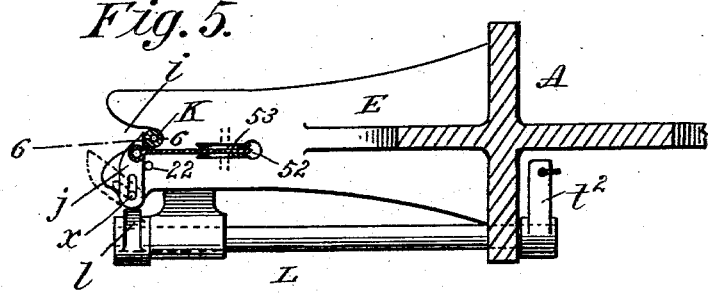
*Fig. 5.*
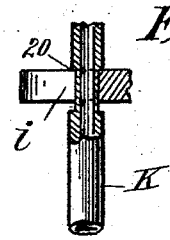
*Fig. 6.*
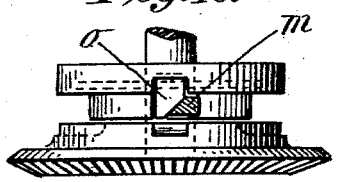
*Fig. 10.* *Fig. 7.*
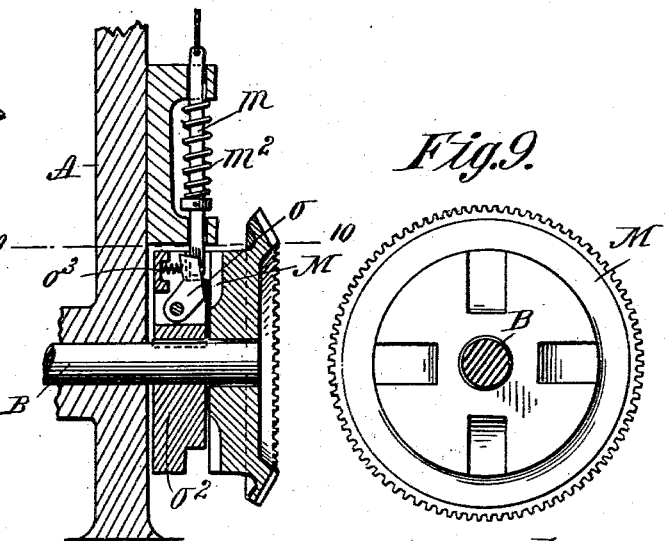
*Fig. 8.* *Fig. 9.*
Witnesses:
J. W. Garfield
N. J. Clemons
Inventor
Michael J. Owens
by Chapin &c.
Attorneys

UNITED STATES PATENT OFFICE.

MICHAEL J. OWENS, OF TOLEDO, OHIO, ASSIGNOR OF ONE-HALF TO EDWARD D. LIBBEY, OF SAME PLACE.

MACHINE FOR BLOWING GLASS.

SPECIFICATION forming part of Letters Patent No. 548,587, dated October 22, 1895.

Application filed April 1, 1895. Serial No. 543,937. (No model.)

*To all whom it may concern:*

Be it known that I, MICHAEL J. OWENS, a citizen of the United States of America, residing at Toledo, in the county of Lucas and State of Ohio, have invented new and useful Improvements in Machines for Blowing Glass, of which the following is a specification.

This invention relates to a partially-automatic machine for blowing glass into paste-molds, the object being to provide a machine which is susceptible of practical use for the rapid production of large quantities of glass vessels or objects of a given shape.

The machine of this invention embodies a means for supporting the blow-pipe with its one end in communication with the air-supplying device and its other in operative proximity to or within the mold; certain means for automatically admitting air through the blow-pipe; a sectional mold, which is adapted to be closed about or adjacent the gathering end of the blow-pipe and to be also automatically opened, whereby the paste-covered inner surface thereof may be subjected to a sprinkling action; means for automatically effecting the closing and afterward the opening of the mold-sections and for imparting to them while they are closed rotary motions, and means for automatically causing a sprinkling of the paste-lined mold-sections while opened. The automatic operations are instituted by and in consequence of the placing of the blow-pipe which has the gathering of glass thereon in the machine in its position of support and for the reception of air communication therethrough.

The invention consists in certain constructions of devices and in the combination for co-operative action of various devices, all substantially as will hereinafter fully appear and be set forth in the claims.

Reference is to be had to the accompanying drawings, in which—

Figure 1 is a side elevation of the present improved machine, the blow-pipe being shown in place and the mold closed. Fig. 1ª is a perspective view of the mechanism which operates the yoke which closes the mold and permits it to open. Fig. 2 is a front elevation of the machine. Fig. 3 is a horizontal section as taken on the line 3 3, Fig. 2, showing part of the machine—viz., the sectional mold and the operating-yoke therefor. Fig. 4 is a front elevation of the part shown in Fig. 3, the yoke being seen in vertical section. Fig. 5 is a plan view as seen below the plane indicated on the line 5 5, Fig. 1. Fig. 6 is a vertical sectional view of parts as taken on the line 6 6, Fig. 5. Fig. 7 is a central vertical section through the clutch mechanism which effects the starting and automatic stopping of the machine. Fig. 8 is a cross-sectional view of the intermittently-operating shaft on which the clutch is mounted, together with a face view of the clutch. Fig. 9 is a similar view as taken on the same plane of cross-section as Fig. 8, but looking in the opposite direction, whereby the face of the constantly-rotating gear-wheel is seen. Fig. 10 is a plan view of the parts seen in Fig. 7 below the plane indicated by 10 10.

Similar characters of reference indicate corresponding parts in all of the views.

A detailed description of the mechanism and parts thereof will be now given, to be followed by the description of the operation.

The machine embodies the standard A of suitably massive and stable construction and having a wide base, and has near the bottom thereof bearings for the horizontal rotatable shaft B and also for the driving-shaft C. Above the shaft B are, at varying heights, the forwardly-extending shelf-like projections D, E, and F.

The bracket D has vertical bearings for the shaft G, which at its upper end carries the base $a$, upon which the mold-sections $b\ b$ are pivotally supported, they having suitable ears, which are pinned to lugs provided upon said base.

The mold-supporting shaft G by the bevel-gears $d$ has connection with the counter-shaft $e$, which also has the pinion $f$ thereon that meshes into the gear $f^2$, which is fixed on shaft B.

Above the bracket D is the hinged yoke H, which encircles the mold-base, and is adapted upon its upward swinging movement to have a cam-like impingement against the edges of the weighted wings $b^2$ of the mold-sections and thereby to swing said sections against their tendency to gravitate and open into their closed positions, which positions are seen in Figs. 1 and 2. The yoke has the depending adjustable screw $g$, the lower end of which is in bearing against the vertically-movable bar $h$, the roller $h^2$, journaled at the lower end thereof, resting peripherally upon the cam-wheel J, which is fixed upon the aforesaid shaft B.

The bracket E, as particularly seen by Figs. 5 and 6, has the recess $i$ within its forward edge, the width of which at its inner boundary is such as to permit the engagement thereat of the necked-down portion 20 of the blow-pipe K. The dog $j$ is mounted upon the top of the bracket $e$, and is connected to swing thereon across and away from across said recess $i$, and also to have in addition to its swinging movement an endwise-sliding movement, all by reason of the pin-and-slot connection indicated at $x$, Fig. 5. The stop-pin 22 limits undue inward-swinging movement of this dog. Under and alongside of the bracket E is a rock-shaft L, having at its opposite ends the upwardly and the more or less nearly horizontally extending arms $l$ and $l^2$, the one $l$ being in engagement with the aforesaid dog $j$ to be by the dog swung when the latter has imparted to it its endwise-sliding movement. The other arm $l^2$ has connected to it the flexible connection $l^3$, which is secured to the bar $m$, which is movable vertically in suitable guideways therefor. This bar has applied thereto the spring $m^2$, whereby it normally is forced to the limit of its downward movement, which is in the path of the clutch-dog $o$, carried by and within a suitable recess of the clutch-carrier $o^2$, which is affixed upon the aforesaid shaft B. The spring $o^3$ exerts a tendency to move the dog $o$, when it may be permitted so to be moved, into clutch engagement with the wheel M, which is loose and constantly rotating upon the shaft B by reason of its being geared to the driving-shaft C. The lower extremity of the aforesaid bar $m$ is beveled, as seen by the cross-section of this bar, which appears in Fig. 10.

The reservoir N is supported beneath the bracket E and between it and the level of the sectional paste-mold and has the conduit $q$, leading forwardly from its front and terminating in the branched extremities, which are provided with the downturned sprinklers $q^2$, arranged and directed for sprinkling the paste-lined surfaces of the mold-sections when the latter are permitted to be swung open. (See Fig. 4 particularly.) The conduit $q$ has the valve, which is sufficiently indicated at $s$, and to the operating handle or lever thereof is secured the cord which runs therefrom upwardly around the sheave $s^3$ to a connection with the aforesaid dog $j$.

The bracket F supports the hollow arm Q, which has the two chambers or passages $t$ and $u$ therein, one leading from the source of air-supply and the other terminating in the downwardly-directed opening $u^2$, within which is the vertically-movable tube $u^3$, having at its lower end the downwardly-flaring receiving-socket for the upper end of the blow-pipe K. The passages $t$ and $u$ are separated by the web-wall $t^2$, having the opening $t^3$, which forms communication between said passages. The opening $t^3$ is normally closed by the valve $v$, to which is provided the spring $v^2$. The intermediately-pivoted lever $w$ has one end in bearing engagement against the upper end of the aforesaid vertically-movable tube $u^3$ and its other arm rests upon the top of the valve-stem.

When the blow-pipe has its shouldered central portion 20 moved into the recess $i$ at the forward edge of the shelf, which it engages for its support, it exerts a cam-like action against the inclined end of the dog, causing the latter to move endwise, which it is permitted to do by reason of the slot within which the pivot (seen at $x$) protrudes. This imparts against the resistance of the spring $m^2$ a swinging movement to the rock-shaft arm $l$, a rocking movement to the said shaft, a swinging movement to the rock-shaft arm $l^2$, and an endwise drawing of the vertical trip-bar $m$, which releases the clutch-dog to the action of its spring $o^3$, whereby the clutch is thrown into engagement with the constantly-rotating wheel M, which is loose on the shaft B. This clutch is of a well-known kind and is illustrated in Figs. 7 to 10, inclusive, and having made one revolution the clutching-dog, by impingement against the beveled side of the trip-bar, (which, after having been raised to permit the clutch to start, promptly snaps back by reason of the spring to its original position in the path of revolution of the clutch-dog,) forces the dog inwardly within the recess therefor and out of the clutch, whereby further rotary motion is arrested until the next operation. The above-mentioned clutch, per se, constitutes no part of the present invention.

Preparatory to starting the machine the cam-wheel, which is on the intermittently-rotating shaft C, stands with the lowest part of the cam upward and in contact with the cam-roll on the vertically-movable bar $h$ of the mold-yoke, which latter therefore is dropped to its lowest position by gravity, the molds having automatically opened, all as seen in Figs. 3 and 4; but as the cam begins its movement it effects the raising of the yoke and the maintenance thereof in its raised position until the cam has completed its circuit, whereupon the yoke descends and the mold-sections open by reason of the gravity effect of the weighted wings thereof.

The mold-supporting shaft, deriving its rotary movement concurrently with the elevation of the mold-yoke through the aforementioned gearing $d\ d\ f\ f$, has its speed multiplied, so that the mold has several rotations around the stationary blow-pipe before being permitted to open. As the yoke is next permitted to descend at the time when the machine stops, whereby the mold-sections are spread open with their inner surfaces upward and whereupon the blow-pipe may be removed, there will be concurrent with the removal of the blow-pipe and outward swinging of the dog $j$, through the cord-and-lever connection with the valve $s$ in the conduit leading from the liquid-reservoir to the sprinklers, an opening of said valve, resulting in the sprinkling of the exposed paste-covered surfaces of the mold-sections.

Of course it is to be understood that when the blow-pipe is brought to its position in the flaring socket $u^4$ by forcing the endwise movable tube $u^3$ upward, which it does as it seats itself, it swings the lever $w$ to open the valve to the communication with the air-supplying conduit or reservoir, the opened communication continuing until the removal of the blow-pipe.

Having thus described my invention, what I claim, and desire to secure by Letters Patent, is—

1. In a glass blowing machine, the combination with the rotatable mold-support and means for rotating it, of the mold-sections pivotally mounted on the mold-support to turn in unison therewith, the movable yoke, H, loosely embracing the mold-sections, and independently of which the said sections revolve without obstruction by the yoke, and means for imparting the reciprocatory movements to said yoke, substantially as described.

2. In a glass blowing machine, the combination with a mold-support which is rotatable in a fixed plane and having pivoted thereto the mold-sections, $b\,b$, which are provided with the outwardly extending weight wings, $b^2$, $b^2$, and which turn in unison with said support, of the yoke, H, pivoted to the frame of the machine and having its extremity loosely embracing said sections, and independently of which said mold sections revolve, without obstruction by the yoke, and a mechanism for imparting the reciprocatory movements to said yoke for operating, by its impingement thereupon, the mold-sections, substantially as described.

3. In a glass blowing machine, the combination with the mold-support having the mold-sections pivoted thereon, a removable blow-pipe and a blow-pipe support, of the yoke for closing said sections, the liquid reservoir, and a conduit, having one or more sprinklers, connected with said reservoir which are directed toward the positions of the opened mold-sections, a valve in said conduit, mechanism for operating the yoke to close the mold-sections and a mechanism for operating the sprinkler valves having a part thereof adjacent the blow-pipe support, and adapted on the removal of the blow-pipe to have, by said pipe, valve-operating movements imparted thereto, substantially as described.

4. In a glass blowing machine, the combination with the rotary mold-support and the mold-sections pivotally mounted thereon, of the yoke, H, the shaft, B, having the cam, J, thereon and having driving connections with the rotary mold-support, the bar, $h$, having an engagement with the cam and engaging the yoke, and means for intermittently rotating said shaft, B, substantially as and for the purposes set forth.

5. In a glass blowing machine, the combination with the support and the mold-sections pivoted thereon, of the yoke coacting with the said sections to close them and to permit them to open, the rotary cam, J, and the movable bar, $h$, actuated by said cam, and in turn imparting a movement to the yoke, substantially as described.

6. In a glass blowing machine, the combination with the support and the mold-sections pivoted thereon, of the yoke coacting with said sections to close them and having the screw abutment, $g$, adjustably mounted thereon, the cam, J, and bar, $h$, having the roller, $h^2$, adapted to coact with said abutment, substantially as described.

7. In a glass blowing machine, the combination with the mold-support, mold-sections pivoted thereon, the movable yoke, H, coacting therewith, the blow-pipe-support, and an air-conduit, of the removable blow-pipe adapted to be placed in connection with the air-conduit and to be sustained by such support with its end in proximity to the mold, mechanism for intermittently operating said yoke, and controlling devices therefor having connections which are adapted to be operated by the blow-pipe as the same is brought to its operative position in the machine, substantially as described.

8. In a glass blowing machine, the combination with the bracket or support, E, having the recess, $i$, the necked or shouldered blow-pipe adapted for engagement in said recess, and the rotatable mold support having the sectional and separable mold mounted thereon, of a power transmitting shaft, B,—which mediately imparts the rotation to the said support for the sectional mold, a driving wheel for, and loose upon, said shaft, B, and a clutch whereby the driving wheel may be thrown into connection with a driving wheel for said shaft, the movable clutch-restraining member, a dog mounted adjacent said recess and actuated by the blow-pipe when placed in the said recess, and connections between said dog and said clutch-restraining member, substantially as and for the purposes set forth.

9. In a glass blowing machine, the combination with the recessed support, E, and the clutch-restraining bar, $m$, having the spring, $m^2$, of the dog, $j$, having the pin and slot connection on the said support, the rock-shaft, L, having the arms, $l$, $l^2$, one of which is engaged by said dog and the other connected to said bar, $m$, substantially as described.

10. In a glass blowing machine, the combination with a support or holder for a removable blow-pipe, the removable blow-pipe, and the separable mold-sections, of a reservoir and a conduit having a sprinkler and a valve, the dog adapted to be tripped on the removal from the machine of the blow-pipe and connected to the said valve, substantially as described.

11. In a glass blowing machine, the combination with an air-conduit having a movable tubular continuation which is provided at its end with a socket for receiving the end of a blow-pipe, of a valve for normally closing the said conduit against the passage of air therethrough, and a lever engaged by said movable tube, and engaging the valve, substantially as described.

12. In a glass blowing machine, in combination, a support for a removable blow-pipe, an air-supplying apparatus, a sectional mold which is adapted to be closed about the gathering end of the blow-pipe and to be opened, means for automatically effecting the closing and afterward the opening of the mold-sections, and means for imparting to them, while they are closed, rotary movements about the axis of the blow-pipe, substantially as described.

13. In a glass blowing machine, in combination, a support for a removable blow-pipe, an air-supplying apparatus, a sectional mold which is adapted to be closed about the gathering end of the blow-pipe and to be opened, means for automatically effecting the closing and afterward the opening of the mold-sections, means for imparting to them, while they are closed, rotary movements about the axis of the blow-pipe, and means for causing a sprinkling of the mold sections while they are opened leaving their paste-lined surfaces exposed, substantially as described.

MICHAEL J. OWENS.

Witnesses:
A. D. STEWART,
MINNIE NORTON.